(12) United States Patent
Peiffer et al.

(10) Patent No.: US 6,884,517 B2
(45) Date of Patent: *Apr. 26, 2005

US006884517B2

(54) HIGH-WHITENESS, BIAXIALLY ORIENTED POLYESTER FILM, ITS USE AND PROCESS FOR ITS PRODUCTION

(75) Inventors: Herbert Peiffer, Mainz (DE); Gottfried Hilkert, Saulheim (DE); Bart Janssens, Wiesbaden (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/791,447

(22) Filed: Feb. 23, 2001

(65) Prior Publication Data

US 2002/0160215 A1 Oct. 31, 2002

(30) Foreign Application Priority Data

Mar. 10, 2000 (DE) .................................... 100 11 652

(51) Int. Cl.$^7$ .......................... B32B 27/08; B32B 27/18; B32B 27/36; B32B 31/30
(52) U.S. Cl. ................ 428/480; 428/304.4; 428/314.4; 428/315.5; 428/315.9; 428/317.9; 428/319.3; 428/319.7; 428/910; 428/903.3; 525/165; 525/176; 264/288.4; 264/290.2
(58) Field of Search ................ 428/480, 910, 428/903.3, 304.4, 314.4, 315.5, 315.9, 317.9, 319.3, 319.7, 980; 525/165, 176; 264/288.4, 290.2

(56) References Cited

U.S. PATENT DOCUMENTS

| 4,614,778 | A | * | 9/1986 | Kajiura et al. | 526/169.2 |
|---|---|---|---|---|---|
| 5,171,625 | A | * | 12/1992 | Newton | 428/195.1 |
| 5,179,171 | A | * | 1/1993 | Minami et al. | 525/288 |
| 5,324,574 | A | * | 6/1994 | Sakamoto et al. | 428/220 |
| 5,843,578 | A | * | 12/1998 | Sasaki et al. | 428/315.5 |
| 5,869,586 | A | * | 2/1999 | Riedel et al. | 526/131 |
| 5,942,329 | A | * | 8/1999 | Nakayama et al. | 428/423.1 |
| 6,326,431 | B1 | * | 12/2001 | Peiffer et al. | 525/177 |
| 6,627,695 | B2 | * | 9/2003 | Murschall et al. | 524/513 |
| 6,635,340 | B2 | * | 10/2003 | Peiffer et al. | 428/308.4 |
| 6,641,924 | B1 | * | 11/2003 | Peiffer et al. | 428/480 |
| 2001/0029274 | A1 | * | 10/2001 | Murschall et al. | 524/93 |
| 2001/0031802 | A1 | * | 10/2001 | Murschall et al. | 524/1 |
| 2002/0115760 | A1 | * | 8/2002 | Murschall et al. | 524/128 |
| 2003/0170476 | A1 | * | 9/2003 | Murschall et al. | 428/483 |
| 2003/0170479 | A1 | * | 9/2003 | Peiffer et al. | 428/515 |
| 2003/0180560 | A1 | * | 9/2003 | Peiffer et al. | 428/480 |

FOREIGN PATENT DOCUMENTS

| DE | 2 353 347 | | 5/1974 |
|---|---|---|---|
| DE | 195 40 277 | | 5/1996 |
| EP | 0 078 633 | | 5/1983 |
| EP | 0 300 060 | | 1/1989 |
| EP | 0 360 201 | | 3/1990 |
| EP | 0 522 758 | A1 | 1/1993 |
| EP | 0 768 495 | A2 | 7/1997 |
| EP | 0 795 399 | | 9/1997 |
| EP | 0 044 515 | | 1/1998 |
| EP | 1 068 949 | A1 | 1/2000 |
| EP | 1 068 949 | A1 * | 1/2001 |
| JP | 05-009319 | * | 1/1993 |
| JP | 05 009319 | A | 1/1993 |
| JP | 05-140349 | * | 6/1993 |
| JP | 05 140349 | A | 6/1993 |
| JP | 05-230253 | * | 9/1993 |
| JP | 05 230253 | A | 9/1993 |
| JP | 10 060143 | A | 3/1998 |
| JP | 11-035717 | * | 2/1999 |

OTHER PUBLICATIONS

Schimtz, Peter et al., "Films." Ullmann's Encyclopedia of Industrial Chemistry, 5th Ed., vol. A11, 1988, pp.85–89.*

* cited by examiner

Primary Examiner—Vivian Chen
(74) Attorney, Agent, or Firm—ProPat, L.L.C.

(57) ABSTRACT

The present invention relates to a high-whiteness, biaxially oriented polyester film with at least a base layer made from polyester. The base layer of the polyester film of the invention also comprises from 2 to 60% by weight of a cycloolefin copolymer (COC), from 0.1 to 25% by weight of a white pigment, and, if desired, from 0 to 5% by weight of an optical brightener, based on the weight of the base layer. The glass transition temperature of the COC here is to be within the range from 70 to 270° C. The film is particularly suitable for packing foods or other consumable items which are sensitive to light and/or to air, or for use in industry, e.g. for producing hot-stamping foils or as a label film, or for image-recording papers, printed sheets, or magnetic recording cards, or for processing on high-speed machinery for winding, metallizing, printing or laminating.

8 Claims, No Drawings

US 6,884,517 B2

HIGH-WHITENESS, BIAXIALLY ORIENTED POLYESTER FILM, ITS USE AND PROCESS FOR ITS PRODUCTION

The present invention relates to a high-whiteness, biaxially oriented polyester film which comprises at least one layer which comprises a polyester, a cycloolefin copolymer (COC), at least one white pigment and, if desired, an optical brightener. The invention further relates to the use of the film and to a process for its production.

White, biaxially oriented polyester films are known from the prior art. These known prior art films are either easy to produce, have good optical properties or have acceptable processing performance.

BACKGROUND OF THE INVENTION

DE-A 2 353 347 describes a process for producing milky polyester film having one or more layers, which comprises preparing a mixture from particles of a linear polyester with from 3 to 27% by weight of a homopolymer or copolymer of ethylene or propylene, extruding the mixture as a film, quenching the film and biaxially orienting the film via orientation in directions running perpendicular to one another, and heat-setting the film. A disadvantage of this process is that regrind which arises during production of the film (essentially a mixture of polyester and ethylene copolymer or propylene copolymer) cannot be reused without yellowing the film. This makes the process uneconomic, but the yellowish film produced with regrind would not gain acceptance in the market. In addition, this mix gives a level of film whiteness which is still highly unsatisfactory.

EP-A 0 300 060 describes a single-layer polyester film which comprises, besides polyethylene terephthalate, from 3 to 40% by weight of a crystalline propylene polymer and from 0.001 to 3% by weight of a surface-active substance. The effect of the surface-active substance is to increase the number of vacuoles in the film and at the same time to reduce their size to the desired extent. This gives the film greater opacity and lower density. A residual disadvantage of the film is that regrind which arises during production of the film (essentially a mixture of polyester and propylene homopolymer) cannot be reused without yellowing the film. This makes the film uneconomic, but the yellowish film produced with regrind would not gain acceptance in the market. In addition, this mix gives a level of film whiteness which is still highly unsatisfactory.

EP-A 0 360 201 describes a polyester film having at least two layers and comprising a base layer with fine vacuoles, with a density of from 0.4 to 1.3 kg/dm$^3$, and having at least one outer layer whose density is above 1.3 kg/dm$^3$. The vacuoles are achieved by adding from 4 to 30% by weight of a crystalline propylene polymer, followed by biaxial stretching of the film. The additional outer layer improves the ease of production of the film (no streaking on the film surface), and the surface tension is increased and the roughness of the laminated surface can be reduced. A residual disadvantage is that regrind arising during production of the film (essentially a mixture of polyester and propylene homopolymer) cannot be reused without yellowing the film. This makes the process uneconomic, but the yellowish film produced with regrind would not gain acceptance in the market.

EP-A 0 795 399 describes a polyester film having at least two layers and comprising a base layer with fine vacuoles, the density of which is from 0.4 to 1.3 kg/dm$^3$, and having at least one outer layer, the density of which is greater than 1.3 kg/dm$^3$. The vacuoles are achieved by adding from 5 to 45% by weight of a thermoplastic polymer to the polyester in the base, followed by biaxial stretching of the film. The thermoplastic polymers used are, inter alia, polypropylene, polyethylene, polymethylpentene, polystyrene or polycarbonate, and the preferred thermoplastic polymer is polypropylene. As a result of adding the outer layer, ease of production of the film is improved (no streaking on the film surface), the surface tension is increased and the roughness of the laminated surface can be matched to prevailing requirements. Further modification of the film in the base layer and/or in the outer layers, using white pigments (generally TiO$_2$) and/or using optical brighteners permits the properties of the film to be matched to the prevailing requirements of the application. A residual disadvantage is that regrind which arises during production of the film (essentially a mixture of polyester and the added polymer) cannot be reused without undefined and highly undesirable changes in the color of the film. This makes the process uneconomic, but the film produced with regrind would not gain acceptance in the market. In addition, this mix gives a level of film whiteness which is still highly unsatisfactory.

DE-A 195 40 277 describes a polyester film having one or more layers and comprising a base layer with fine vacuoles, with a density of from 0.6 to 1.3 kg/dm$^3$, and having planar birefringence of from −0.02 to 0.04. The vacuoles are achieved by adding from 3 to 40% by weight of a thermoplastic resin to the polyester in the base, followed by biaxial stretching of the film. The thermoplastic resins used are, inter alia, polypropylene, polyethylene, polymethylpentene, cyclic olefin polymers, polyacrylic resins, polystyrene or polycarbonate, preferred polymers being polypropylene and polystyrene. By maintaining the stated limits for the birefringence of the film, the film claimed has in particular superior tear strength and superior isotropy properties. However, a residual disadvantage is that regrind arising during production of the film cannot be reused without undefined discoloration of the film arising, and this in turn is highly undesirable. This makes the process uneconomic, but the film produced with regrind would not gain acceptance in the market. In addition, this mix gives a level of film whiteness which is still highly unsatisfactory.

The object of the present invention was to provide a high-whiteness, biaxially oriented polyester film which has improved ease of production, i.e. low production cost. In particular, it should be possible for all of the cut material (regrind) directly associated with the production process, in an amount of from 10 to 70% by weight based on the total weight of the film, to be reused for the production process without any significant adverse effect on the physical or optical properties of the film produced using regrind. In particular, the addition of regrind should not cause any significant yellow coloration in the film.

SUMMARY OF THE INVENTION

According to the invention, this object is achieved by means of a high-whiteness, biaxially oriented polyester film with at least a base layer made from polyester, the characterizing features of which are that at least the base layer also comprises an amount within the range from 2 to 60% by weight of a cycloolefin copolymer (COC), an amount within the range from 0.1 to 25% by weight of a white pigment, and an amount within the range from 0 to 5% by weight of an optical brightener, based on the weight of the base layer, the glass transition temperature of the cycloolefin copolymer (COC) being within the range from 70 to 270° C.

DETAILED DESCRIPTION OF THE INVENTION

For the purposes of the present invention, a high-whiteness, biaxially oriented polyester film is a film whose whiteness is above 80%, preferably above 85% and particularly preferably above 90%. In addition, the opacity of the film of the invention is above 55%, preferably above 60% and particularly preferably above 65%.

To achieve the desired whiteness of the film of the invention, the amount of COC in the base layer should be above 2% by weight, otherwise the whiteness is below 70%. On the other hand, if the amount of COC is above 60% by weight, the film is no longer cost-effective to produce, since the process of orienting the film becomes unreliable.

It is also necessary for the glass transition temperature of the COC used to be above 70° C. Otherwise, if the glass transition temperature of the COC used is below 70° C., the polymer mixture is difficult to process, since it becomes difficult to extrude. The desired whiteness is lost and use of regrind gives a film with a tendency toward increased yellowness. On the other hand, if the glass transition temperature of the COC selected is above 270° C. the homogenization of the polymer mixture in the extruder will no longer be sufficient. This then gives a film with undesirably inhomogeneous properties.

In the preferred embodiment of the film of the invention, the glass transition temperature of the COCs used is within the range from 90 to 250° C., and in the particularly preferred embodiment it is within the range from 110 to 220° C.

Surprisingly, it has been found that a white, opaque film can be produced by adding a COC in the manner described above.

The whiteness and the opacity of the film can be adjusted with precision and adapted to particular requirements by varying the amount and nature of the COC added. This means that the use of other commonly used whitening or opacifying additives can substantially be dispensed with.

None of the features described was foreseeable. This was particularly the case since COCs are evidently substantially incompatible with polyethylene terephthalate but are known to require stretching ratios and stretching temperatures similar to those for polyethylene terephthalate. Under these circumstances the skilled worker would not have expected that a white, opaque film could be produced under these production conditions.

In the preferred and particularly preferred embodiments, the film of the invention has high/particularly high whiteness and high/particularly high opacity, while addition of regrind causes extremely little change in the color of the film.

The film of the invention has one or more layers. Single-layer embodiments have the structure identical with that of the COC-containing layer described below. Multilayer embodiments have at least two layers and always comprise the COC-containing layer and at least one other layer, where the COC-containing layer is the base layer but may also form the intermediate layer or the outer layer of a film having more than one layer. In one preferred embodiment, the COC-containing layer forms the base layer of the film with at least one outer layer, preferably with outer layers on both sides, and an intermediate layer or intermediate layers may, if desired, be present on one side or on both sides. In another embodiment, the COC-containing layer also forms an intermediate layer of a multilayer film. Other embodiments with COC-containing intermediate layers have a five-layer structure and, alongside the COC-containing base layer, have COC-containing intermediate layers on both sides. In another embodiment, the COC-containing layer can form, in addition to the base layer, and on one or both sides, an outer layer or outer layers on the base layer or on the intermediate layer. For the purposes of the present invention, the base layer is that layer which makes up more than 50%–100%, preferably 70–90%, of the total thickness of the film. The outer layers are the layers which form the outermost layers of the film.

Each embodiment of the invention is a non-transparent, opaque film. For the purposes of the present invention, non-transparent films are films whose light transmittance to ASTM-D 1003-77 is below 95%, preferably below 75%.

The COC-containing layer (the base layer) of the film of the invention comprises a polyester, preferably a polyester homopolymer, a COC, and also, if desired, other additives, in each case in effective amounts. This layer generally comprises at least 20% by weight, preferably from 40 to 96% by weight, in particular from 70 to 96% by weight, of polyester, based on the weight of the layer.

The base layer of the film comprises, as polyester, a thermoplastic polyester. Polyesters suitable here are those made from ethylene glycol and terephthalic acid (=polyethylene terephthalate, PET), from ethylene glycol and naphthalene-2,6-dicarboxylic acid (=polyethylene 2,6-naphthalate, PEN), from 1,4-bishydroxymethyl-cyclohexane and terephthalic acid (=poly-1,4-cyclohexanedimethylene terephthalate, PCDT) or else from ethylene glycol, naphthalene-2,6-dicarboxylic acid and biphenyl-4,4'-dicarboxylic acid (=polyethylene 2,6-naphthalate bibenzoate, PENBB). Particular preference is given to polyesters which are composed of at least 90 mol %, preferably at least 95 mol %, of ethylene glycol units and terephthalic acid units or of ethylene glycol units and naphthalene-2,6-dicarboxylic acid units. The remaining monomer units are derived from other aliphatic, cycloaliphatic or aromatic diols and, respectively, dicarboxylic acids, as may also be present in layer A (A =outer layer 1) or in layer C (C=outer layer 2) of a multilayered ABC (B=base layer) film.

Examples of other suitable aliphatic diols are diethylene glycol, triethylene glycol, aliphatic glycols of the general formula HO—$(CH_2)_n$—OH, where n is an integer from 3 to 6 (in particular 1,3-propanediol, 1,4-butanediol, 1,5-pentanediol and 1,6-hexanediol) or branched aliphatic glycols having up to 6 carbon atoms. Among the cycloaliphatic diols, mention should be made of cyclohexanediols (in particular 1,4-cyclohexanediol). Other suitable aromatic diols are those, for example, of the formula HO—$C_6H_4$—X—$C_6H_4$—OH where X is —$CH_2$—, —$C(CH_3)_2$—, —$C(CF_3)_2$—, —O—, —S—or —$SO_2$—. Bisphenols of the formula HO—$C_6H_4$—$C_6H_4$—OH are also highly suitable.

Other preferred aromatic dicarboxylic acids are benzenedicarboxylic acids, naphthalenedicarboxylic acids (such as naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) and stilbene-x,x'-dicarboxylic acids. Among the cycloaliphatic dicarboxylic acids mention should be made of cyclohexanedicarboxylic acids (in particular cyclohexane-1,4-dicarboxylic acid). Among the aliphatic dicarboxylic acids, the ($C_3$–$C_{19}$)-alkanedioic acids are particularly suitable, where the alkane moiety may be straight-chain or branched.

The polyesters may, for example, be prepared by the transesterification process. The starting materials here are dicarboxylic esters and diols, and these are reacted using the usual transesterification catalysts, such as salts of zinc, of calcium, of lithium, of magnesium or of manganese. The intermediates are then polycondensed in the presence of typical polycondensation catalysts, such as antimony trioxide or titanium salts. They may equally well be prepared by the direct esterification process in the presence of polycondensation catalysts, starting directly from the dicarboxylic acids and the diols.

According to the invention, the COC-containing layer or, in the case of single-layer embodiments, the film, comprises an amount of not less than 2.0% by weight, preferably from 4 to 50% by weight and particularly preferably from 6 to 40% by weight, of a cycloolefin copolymer (COC), based on the weight of the base layer or, in the case of single-layer embodiments, based on the weight of the film. It is significant for the present invention that the COC is not compatible with the polyethylene terephthalate and does not form a homogeneous mixture with the same in the melt.

Cycloolefin polymers are homopolymers or copolymers which contain polymerized cycloolefin units and, if desired, acyclic olefins as comonomer. Cycloolefin polymers suitable for the present invention contain from 0.1 to 100% by weight, preferably from 10 to 99% by weight, particularly preferably from 50 to 95% by weight, of polymerized cycloolefin units, in each case based on the total weight of the cycloolefin polymer. Particular preference is given to polymers which have been built up using the monomers comprising the cyclic olefins of the formulae I, II, III, IV, V or VI:

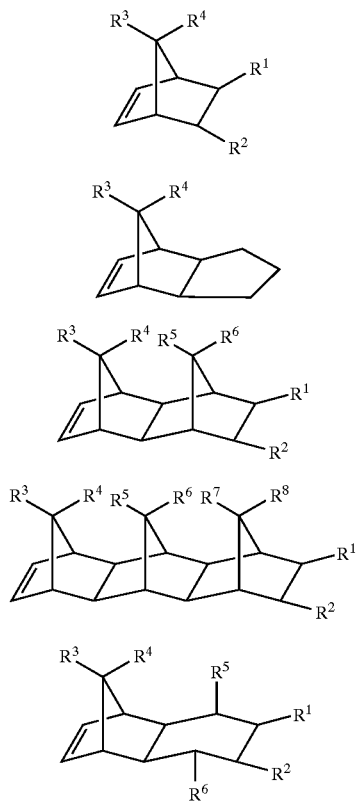

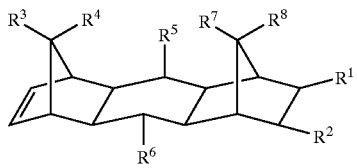

$R^1$, $R^2$, $R^3$, $R^4$, $R^5$, $R^6$, $R^7$ and $R^8$ in these formulae are identical or different and are a hydrogen atom or a $C_1$–$C_{30}$-hydrocarbon radical, or two or more of the radicals $R^1$ to $R^8$ have been bonded cyclically, and the same radicals in the different formulae may have the same or a different meaning. Examples of $C_1$–$C_{30}$-hydrocarbon radicals are linear or branched $C_1$–$C_8$-alkyl radicals, $C_6$–$C_{18}$-aryl radicals, $C_7$–$C_{20}$-alkylenearyl radicals and cyclic $C_3$–$C_{20}$-alkyl radicals and acyclic $C_2$–$C_{20}$-alkenyl radicals.

If desired, the COCs may contain from 0 to 45% by weight, based on the total weight of the cycloolefin polymer, of polymerized units of at least one monocyclic olefin of the formula VII:

$$HC=CH \atop (CH_2)_n \qquad (VII)$$

n here is a number from 2 to 10.

If desired, the COCs may contain from 0 to 99% by weight, based on the total weight of the COC, of polymerized units of an acyclic olefin of the formula VIII:

$$R^9\!\!\!\diagdown\!\!C\!\!=\!\!C\!\!\diagup\!\!\!R^{11} \atop R^{10}\qquad R^{12} \qquad (VIII)$$

$R^9$, $R^{10}$, $R^{11}$ and $R^{12}$ here are identical or different and are a hydrogen atom or a $C_1$–$C_{10}$-hydrocarbon radical, e.g. a $C_1$–$C_8$-alkyl radical or a $C_6$–$C_{14}$-aryl radical.

Other polymers suitable in principle are cycloolefin polymers which are obtained by ring-opening polymerization of at least one of the monomers of the formulae I to VI, followed by hydrogenation.

Cycloolefin homopolymers have a structure composed of one monomer of the formulae I to VI. These cycloolefin polymers are less suitable for the purposes of the present invention. Polymers suitable for the purposes of the present invention are cycloolefin copolymers (COC) which comprise at least one cycloolefin of the formulae I to VI and acyclic olefins of the formula VIII as comonomer. Acyclic olefins preferred here are those which have from 2 to 20 carbon atoms, in particular unbranched acyclic olefins having from 2 to 10 carbon atoms, for example ethylene, propylene and/or butylene The proportion of polymerized units of acyclic olefins of the formula VII is up to 99% by weight, preferably from 5 to 80% by weight, particularly preferably from 10 to 60% by weights based on the total weight of the respective COC.

Among the COCs described above, those which are particularly preferred contain polymerized units of polycyclic olefins having a fundamental norbornene structure, particularly preferably norbornene or tetracyclododecene.

Particular preference is also given to COCs which contain polymerized units of acyclic olefins, in particular ethylene. Particular preference is in turn given to norbornene-ethylene copolymers and tetracyclododecene-ethylene copolymers which in each case contain from 5 to 80% by weight, preferably from 10 to 60% by weight, of ethylene (based on the weight of the copolymer).

The cycloolefin polymers generically described above generally have glass transition temperatures $T_g$ in the range from −20 to 400° C. However, COCs which can be used for the invention have a glass transition temperature $T_g$ above 70° C., preferably above 90° C. and in particular above 110° C. The viscosity number (decalin, 135° C., DIN 53 728) is advantageously from 0.1 to 200 ml/g, preferably from 50 to 150 ml/g.

The COCs are prepared by heterogeneous or homogeneous catalysis with organometallic compounds, as described in a wide variety of documents. Suitable catalyst systems based on mixed catalysts made from titanium compounds and, respectively, vanadium compounds in conjunction with aluminum organyl compounds are described in DD 109 224, DD 237 070 and EP-A-0 156 464. EP-A-0 283 164, EP-A-0 407 870, EP-A-0 485 893 and EP-A-0 503 422 describe the preparation of COCs with catalysts based on soluble metallocene complexes. The preparation processes for COCs described in the abovementioned specifications are expressly incorporated herein by way of reference.

The COCs are incorporated into the film either in the form of pure granules or in the form of granulated concentrate (masterbatch), by premixing the polyester granules or polyester powder with the COC or, respectively, with the COC masterbatch, followed by feeding to an extruder. In the extruder, the mixing of the components continues and they are heated to the processing temperature. It is advantageous here for the novel process if the extrusion temperature is above the glass transition temperature $T_g$ of the COC generally above the glass transition temperature of the COC by at least 5 K; preferably by from 10 to 180 K, in particular by from 15 to 150 K.

For the intermediate layers and, if appropriate, for the outer layer C, it is possible in principle to use the polymers used for the base layer B described above. Besides these, other materials may also be present in the outer layer, and the outer layer C is then preferably composed of a mixture of polymers or of a copolymer or of a homopolymer which comprises ethylene 2,6-naphthalate units and ethylene terephthalate units. Up to 30 mol % of the polymers may be composed of other comonomers (e.g. ethylene isophthalate units).

The base layer and the other layers may additionally comprise conventional additives, such as stabilizers, antiblocking agents and other fillers. They are advantageously added to the polymer or, respectively, to the polymer mixture prior to melting. Examples of stabilizers used are phosphorus compounds, such as phosphoric acid or phosphoric esters.

Typical antiblocking agents (in this context also termed pigments) are inorganic and/or organic particles, such as calcium carbonate, amorphous silica, talc, magnesium carbonate, barium carbonate, calcium sulfate, barium sulfate, lithium phosphate, calcium phosphate, magnesium phosphate, aluminum oxide, lithium fluoride, the calcium, barium, zinc or manganese salts of the dicarboxylic acids used, carbon black, titanium dioxide, kaolin or crosslinked polymer particles, e.g. polystyrene particles or acrylate particles.

The additives selected may also comprise mixtures of two or more different antiblocking agents or mixtures of antiblocking agents of the same composition but different particle sizes. The particles may be added to the polymers of the individual layers of the film in the respective advantageous amounts, e.g. as a glycolic dispersion during the polycondensation or via masterbatches during extrusion. Pigment concentrations which have proven particularly suitable are from 0 to 25% by weight (based on the weight of the respective layer). EP-A-0 602 964, for example, describes the antiblocking agents in detail.

For further improvement of the whiteness of the film, the base layer, according to the invention, and/or, if desired, also another layer comprises at least one white pigment and, if desired, one optical brightener.

Preferred white pigments are titanium dioxide, barium sulfate, calcium carbonate, kaolin, and silicon dioxide, preferably titanium dioxide or barium sulfate.

The titanium dioxide particles may be composed of anatase or rutile, preferably predominantly of rutile, which has greater covering power than anatase. In preferred embodiments, the titanium dioxide particles are composed of at least 95% by weight of rutile. They may be prepared by conventional processes, e.g. by the chloride process or sulfate process. Their amount within the base layer is usefully within the range from 0.1 to 25.0% by weight, preferably from 0.2 to 23.0% by weight, in particular from 0.3 to 22.0% by weight, based on the total weight of the base layer. The average particle size of suitable white pigments is relatively small, preferably within the range from 0.10 to 0.30 $\mu$m, measured by the sedigraph method.

The titanium dioxide particles may have a coating of inorganic oxides, as conventionally used as a coating for $TiO_2$ white pigment in papers or in coating compositions, for improving lightfastness. $TiO_2$ is known to be photoactive. On exposure to UV radiation, free radicals form on the surface of the particles. These free radicals can migrate into the polymer matrix, causing degradation reactions and yellowing. To avoid this, the $TiO_2$ particles may be given an oxidic coating. Particularly suitable oxides for the coating include the oxides of aluminum, silicon, zinc and magnesium, and mixtures of two or more of these compounds. $TiO_2$ particles with a coating made from two or more of these compounds are described in EP-A-0 044 515 and EP-A-0 078 633, for example. The coating may also comprise organic compounds having polar and non-polar groups. The organic compounds have to have adequate thermal stability during the production of the film by extruding the polymer melt. Examples of polar groups are —OH, —OR, —COOX (X =R, H or Na, R =alkyl having from 1 to 34 carbon atoms). Preferred organic compounds are alkanols and fatty acids having from 8 to 30 carbon atoms in the alkyl group, in particular fatty acids and primary n-alkanols having from 12 to 24 carbon atoms, and also polydiorganosiloxanes and/or polyorganohydrosiloxanes, e.g. polydimethylsiloxane and polymethylhydrosiloxane.

The coating for the titanium dioxide particles is usually composed of from 1 to 12 g, in particular from 2 to 6 g, of inorganic oxides and/or from 0.5 to 3 g, in particular from 0.7 to 1.5 g, of organic compound, based on 100 g of titanium dioxide particles. The coating is usually applied to the particles in aqueous suspension. The inorganic oxides may be precipitated from water-soluble compounds, e.g. alkali metal nitrate, in particular sodium nitrate, sodium silicate (water glass) or silica, in the aqueous suspension.

For the purposes of the present invention, inorganic oxides, such as $Al_2O_3$ or $SiO_2$, also include the hydroxides and their various stages of dehydration, e.g. oxide hydrate, the precise composition and structure of which is not known. The oxide hydrates, e.g. of aluminum and/or silicon, are precipitated onto the calcined and ground $TiO_2$ pigment, in aqueous suspension, and the pigments are then washed and dried. This precipitation may therefore take place directly in a suspension such as that produced within the production process after calcination followed by wet-grinding. The oxides and/or oxide hydrates of the respective metals are precipitated from the water-soluble metal salts within the known pH range: for example, for aluminum use is made of aluminum sulfate in aqueous solution (pH below 4) and the oxide hydrate is precipitated within the pH range from 5 to 9, preferably from 7 to 8.5, by adding aqueous ammonia solution or sodium hydroxide solution. If the starting material is water glass solution or alkali metal aluminate solution, the pH of the initial charge of $TiO_2$ suspension should be within the strongly alkaline range (pH above 8). The precipitation then takes place within the pH range from 5 to 8, by adding mineral acid, such as sulfuric acid. Once the metal oxides have been precipitated, the stirring of the suspension continues for from 15 min to about 2 h, aging the precipitated layers. The coated product is separated off from the aqueous dispersion, washed and dried at an elevated temperature, in particular at from 70 to 100° C.

If desired, the film may comprise barium sulfate as pigment instead of titanium dioxide, the amount of barium sulfate being preferably within the range from 0.1 to 25% by weight, particularly preferably from 0.2 to 23% by weight, in particular from 0.3 to 22% by weight, based on the weight of the base layer. The barium sulfate is also preferably fed by way of what is known as masterbatch technology, directly during film production.

In one preferred embodiment, precipitated grades of barium sulfate are used. Precipitated barium sulfate is obtained from barium salts with sulfates or sulfuric acid, as a fine-particle colorless powder whose particle size can be controlled via the conditions of precipitation. Precipitated barium sulfates may be prepared by the conventional processes described in Kunststoff-Journal 8, No. 10, 30–36 and No. 11, 36–31 (1974).

The average particle size is relatively small, preferably within the range from 0.1 to 5 μm, particularly preferably within the range from 0.2 to 3 μm, measured by the sedigraph method. The density of the barium sulfate used is from 4 to 5 g/cm³.

If desired, the film of the invention may also comprise, based on the weight of the base layer, from 0 to 5% by weight, in particular from 0.002 ppm to 3% by weight, particularly preferably from 0.005 ppm to 2.5% by weight, of an optical brightener. The optical brightener is also preferably fed to the polyester by way of what is known as masterbatch technology, directly during film production.

The optical brighteners which are suitable in accordance with the invention are capable of absorbing UV radiation in the region from 360 to 380 nm and re-emitting this as longer-wavelength, visible blue-violet light. Suitable optical brighteners are bisbenzoxazoles, phenylcoumarins and bisstearylbiphenyls, in particular phenylcoumarin, and particular preference is given to triazine phenylcoumarin, obtainable as ®Tinopal from Ciba-Geigy, Basle, Switzerland and ®Hostalux KS (Clariant, Germany), and also ®Eastobrite OB-1 (Eastman). The film of the invention preferably comprises from 0.0010 to 5% by weight of optical brightener soluble in the crystallizable thermoplastic.

Besides the optical brightener, soluble blue dyes may also be added to the polyester if appropriate. Blue dyes which have proven suitable are cobalt blue, ultramarine blue and anthraquinone dyes, in particular ®Sudan Blue 2 (BASF, Ludwigshafen, Germany).

The amounts used of the blue dyes are from 10 to 10,000 ppm, in particular from 20 to 5000 ppm, particularly preferably from 50 to 1000 ppm, based on the weight of the crystallizable polyester.

According to the invention, titanium dioxide, or the barium sulfate, the optical brightener and, if desired, the blue dye may have been added by the polymer producer, or may be fed into the extruder directly by way of masterbatch technology, during film production.

It is particularly preferable for the titanium dioxide or the barium sulfate, the optical brightener and, if desired, the blue dye to be added by way of masterbatch technology. The additives are fully dispersed in a solid carrier material. Carrier materials which may be used are the thermoplastic itself, e.g. the polyethylene terephthalate, or else other polymers sufficiently compatible with the thermoplastic.

It is important that the grain size and bulk density of the masterbatch(es) is/are similar to the grain size and bulk density of the thermoplastic, so that uniform distribution is achieved, and thus uniform whiteness and uniform opacity.

The total thickness of the film may vary within wide limits and depends on the application envisaged. The preferred embodiments of the novel film have total thicknesses of from 4 to 400 μm, preferably from 8 to 300 μm, particularly preferably from 10 to 300 μm. The thickness of any intermediate layer(s) present is/are, in each case independently of one another, from 0.5 to 15 μm, preferably from 1 to 10 μm, in particular from 1 to 8 μm. All the values given are based on one intermediate layer. The thickness of the outer layer(s) is selected independently of the other layers and is preferably within the range from 0.1 to 10 μm, in particular from 0.2 to 5 μm, preferably from 0.3 to 4 μm, and outer layers applied on both sides may be identical or different in terms of their thickness and composition. The thickness of the base layer B is therefore given by the difference between the total thickness of the film and the thickness of the outer and intermediate layer(s) applied, and, similarly to the total thickness, may therefore vary within wide limits.

The invention further provides a process for producing the polyester film of the invention by the extrusion or coextrusion process known per se. For the coextrusion process, the procedure is that the melt(s) corresponding to the single-layer film or to the individual layers of the film is/are extruded/coextruded through a flat-film die, the resultant film is drawn off for solidification on one or more rolls, the film is then biaxially stretched (oriented), and the biaxially stretched film is then heat-set and, if desired, corona- or flame-treated on the surface layer intended for further treatment.

The biaxial orientation is generally carried out in succession. For this, it is preferable to orient first longitudinally (i.e. in MD, the machine direction) and then transversely (i.e. in TD, perpendicularly to the machine direction). This orientates the molecular chains. The longitudinal orientation preferably takes place with the aid of two rolls rotating at different rates corresponding to the desired stretching ratio. For the transverse stretching, an appropriate tenter frame is generally used.

The temperature at which the orientation is carried out may be varied over a relatively wide range and depends on the properties desired in the film. In general, the longitudinal stretching is carried out at from 80 to 130° C. and the transverse stretching at from 90 to 150° C. The longitudinal stretching ratio is generally within the range from 2.5:1 to 6:1, preferably from 3:1 to 5.5:1. The transverse stretching ratio is generally within the range from 3.0:1 to 5.0:1, preferably from 3.5:1 to 4.5:1.

The orientation may also take place in a simultaneous stretching frame (simultaneous stretching). The number of stretching steps here, and the sequence (longitudinal/transverse) are not of decisive importance for the properties of the film. Useful stretching temperatures here, however, are ≦125° C., particularly ≦115° C. The stretching ratios correspond to those for the conventional sequential process.

In the heat-setting which follows, the film is held at a temperature of from 150 to 250° C. for from about 0.1 to 10 s. The film is then cooled and then wound up in the usual manner.

To establish other desired properties, the film may be chemically treated or else corona- or, respectively, flame-treated. The intensity of treatment is selected such that the surface tension of the film is generally above 45 mN/m.

To establish other properties, the film may also be coated. Typical coatings have adhesion-promoting, anti-static, slip-improving or release action. It is clear that these additional coatings may be applied to the film by in-line coating using aqueous dispersions, prior to the transverse stretching procedure.

The particular advantage of the novel film is its high whiteness and high opacity. The whiteness of the film is above 80%, preferably above 85% and particularly preferably above 90%. The opacity of the novel film is above 55%, preferably above 60% and particularly preferably above 65%.

Another particular advantage of the invention is that regrind produced directly during the production process can be reused at a concentration of from 10 to 70% by weight, based on the total weight of the film, without any significant negative effect on the physical or optical properties of the film. In particular, the regrind (composed essentially of polyester and COC) does not give undefined changes in the color of the film, as is the case in the films of the prior art.

A further advantage of the invention is that the production costs of the novel film are comparable with those of conventional opaque films of the prior art. The other properties of the novel film relevant to its processing and use remain essentially unchanged or are even improved.

The film of the invention has excellent suitability for packing foods or other consumable items which are sensitive to light and/or to air. It is also highly suitable for use in the industrial sector, e.g. for producing hot-stamping foils or as a label film. Besides this, the film is, of course, particularly suitable for image-recording papers, printed sheets, and magnetic recording cards, to name just a few possible applications.

The processing performance and winding performance of the film, in particular on high-speed machines (winders, metallizers, printing machines and laminating machines) is exceptionally good. A measure of processing performance is the coefficient of friction of the film, which is below 0.6. A decisive factor affecting winding performance, besides a good thickness profile, excellent layflat and a low coefficient of friction, is the roughness of the film. It has become apparent that the winding of the novel film is particularly good if the average roughness is within the range from 30 to 1000 nm while the other properties are complied with. The roughness may be varied within the stated range by, inter alia, varying the COC concentration and the process parameters in the production process.

The most important film properties according to the invention are again summarized in the table below (Table 1), thus providing a particularly clear picture.

TABLE 1

|  | Range according to the invention | Preferred | Particuarly preferred | Unit | Test method |
|---|---|---|---|---|---|
| Composition |  |  |  |  |  |
| Concentration of cycloolefin copolymer (COC) in base layer | 2–60 | 4–50 | 6–40 | % |  |
| Glass transition temperature of cycloolefin copolymer (COC) | 70–270 | 90–250 | 110–220 | ° C. | DIN 73 765 |
| Concentration of white pigment in base layer | 0.01–5 | 0.1–5 | 0.5–3 | % | Weathering with Atlas Ci65 Weather-Ometer |
| Concentration of optical brightener in base layer | 0.5–30 | 1.0–20 |  | % | DIN 4102 |
| Other film properties |  |  |  |  |  |
| Whiteness | ≧80 | ≧85 | ≧90 | % | Berger |
| Opacity | ≧55 | ≧60 | ≧65 |  | DIN 53 146 |
| Average roughness Ra | 30–1000 | 35–900 | 40–800 |  | DIN 4768, cut-off of 0.25 mm |
| COF | ≦0.6 | ≦0.55 | ≦0.5 |  | DIN 53 375 |
| Gloss, 60° C. | ≧10 | ≧15 | ≧20 |  | DIN 67 530 |

The following parameters were used to describe the polymers and the films:
SV (Standard Viscosity)

The standard viscosity SV (DCA) is determined in dichloroacetic acid by analogy with DIN 53726.

The intrinsic viscosity (IV) is calculated as follows from the standard viscosity $$IV(DCA)=6.907 \cdot 10^{-4} SV(DCA)+0.063096$$

Coefficient of Friction

The coefficient of friction is determined to DIN 53 375.

The coefficient of sliding friction was measured 14 days after production.

Surface Tension

The surface tension was determined by a method known as the ink method (DIN 53 364).

Roughness

The roughness $R_a$ of the film was determined to DIN 4768 with a cut-off of 0.25 mm.

Whiteness and Opacity

The whiteness and opacity were determined with the aid of a Zeiss, Oberkochem (DE) "ELREPHO" reflectance photometer, standard illuminant C, 2° normal observer. Opacity is determined to DIN 53 146. Whiteness is defined as W=RY+3RZ−3RX.

W =whiteness, RY, RZ or RX =relevant reflection factors when the Y, Z or X measurement filter is used. The white standard used was a barium sulfate pressing (DIN 5033, Part 9). A detailed description is given in Hansl Loos, "Farbmessung" [color measurement], Verlag Beruf und Schule, Itzehoe (1989).

Light Transmittance

Light transmittance is measured using a method based on ASTM D1033-77.

Gloss

Gloss was determined to DIN 67 530. The reflectance was measured as an optical value characteristic of a film surface. Based on the standards ASTM D523-78 and ISO 2813, the angle of incidence was set at 60°. A beam of light hits the flat test surface at the set angle of incidence and is reflected and/or scattered by this surface. A proportion of electrical variable is displayed representing light rays hitting the photoelectronic detector. The value measured is dimensionless and must be stated together with the angle of incidence.

Glass Transition Temperature

The glass transition temperature $T_g$ was determined on film specimens with the aid of DSC (differential scanning calorimetry) (DIN 73 765). A DuPont DSC 1090 was used. The heating rate was 20 K/min and the specimen weight was about 12 mg. The glass transition $T_g$ was determined in the first heating procedure. Many of the specimens showed an enthalpy relaxation (a peak) at the beginning of the step-like glass transition. The temperature taken as $T_g$ was that at which the step-like change in heat capacity—without reference to the peak-shaped enthalpy relaxation —achieved half of its height in the first heating procedure. In all cases, there was only a single glass transition observed in the thermogram in the first heating procedure.

EXAMPLE 1 (INVENTIVE)

Chips of polyethylene terephthalate (prepared by the transesterification process using Mn as trans-esterification catalyst, Mn concentration: 100 ppm) were dried at 150° C. to a residual moisture below 100 ppm and fed to the extruder for the base layer B. Alongside this, chips of ®Topas 6015 cycloolefin copolymer (COC) from Ticona (COC composed of 2-norbornene and ethylene, see also W. Hatke: Folien aus COC [COC Films], Kunststoffe 87 (1997) 1, pp. 58–62) with a glass transition temperature $T_g$ of about 160° C. were also fed to the extruder for the base layer B. The proportional amount of the cycloolefin copolymer (COC) in the entire film was 10% by weight.

The base layer also comprised 5% by weight of barium sulfate (Blanc fixe XR-HX, Sachtleben Chemie) and 200 ppm of optical brightener (®Tinopal, Ciba-Geigy, Basel). The additives barium sulfate and optical brightener are added as masterbatch. The masterbatch is composed of clear polymer, 50% by weight of barium sulfate and 2000 ppm of optical brightener, and is metered into the base at 10% by weight.

Extrusion followed by a stepwise longitudinal and transverse orientation is used to produce a high-whiteness, opaque, single-layer film with a total thickness of 23 µm.

Base layer B was a mixture of:

| | |
|---|---|
| 85.0% by weight | of polyethylene terephthalate homopolymer with an SV of 800 |
| 10.0% by weight | of COC from Ticona, Topas 6015 |
| 5% by weight | of masterbatch with barium sulfate and with optical brightener |

The production conditions in the individual steps of the process were:

| | | |
|---|---|---|
| Extrusion: | Temperatures Base layer: | 280° C. |
| | Take-off roll temperature: | 30° C. |
| Longitudinal stretching: | Temperature: | 80–125° C. |
| | Longitudinal stretching ratio: | 4.2 |
| Transverse stretching: | Temperature: | 80–135° C. |
| | Transverse stretching ratio: | 4.0 |
| Setting: | Temperature: | 230° C. |
| | Duration: | 3 s |

The film had the required good properties and the desired handling properties, and the desired processing performance. The properties achieved in films produced in this way are shown in Table 2.

EXAMPLE 2 (INVENTIVE)

Example 1 was now modified by adding 50% of regrind into the base layer. The amount of COC within the base layer produced in this way was again 10% by weight, and the amount of barium sulfate and of optical brightener were unchanged from Example 1. The process parameters were likewise unchanged from Example 1. Visual observation was made of any yellow coloration in the film. Table 2 shows that hardly any yellow coloration was observed in the film.

EXAMPLE 3 (INVENTIVE)

Example 1 was now modified by producing a film of 96 µm thickness. The amount of COC in the base layer was 8% by weight; again, 5% by weight of the masterbatch comprising barium sulfate and optical brightener was added to the base. The process parameters were unchanged from Example 1. Any yellow coloration in the film was observed visually. Table 2 shows that hardly any yellow coloration was observed in the film.

Base layer B was a mixture of:

| | |
|---|---|
| 87.0% by weight | of polyethylene terephthalate homopolymer with an SV of 800 |
| 8.0% by weight | of COC from Ticona, Topas 6015 |
| 5% by weight | of masterbatch with barium sulfate and with optical brightener |

EXAMPLE 4 (INVENTIVE)

Example 3 was now modified by adding 50% by weight of regrind into the base B. The amount of COC in the base layer was again 8% by weight, and the amount of barium sulfate and of optical brightener was unchanged from Example 1. The process parameters were unchanged from Example 1. Any yellow coloration in the film was observed visually. Table 2 shows that hardly any yellow coloration was observed in the film.

COMPARATIVE EXAMPLE 1

Example 1 from DE-A 2 353 347 was repeated. The example was modified with concomitant use of 50% by weight of regrind. It can be seen from Table 2 that marked yellow coloration of the film was observed.

Base layer B was a mixture of:

| | |
|---|---|
| 47.5% by weight of | polyethylene terephthalate homopolymer with an SV of 800 |
| 50.0% by weight of | self-generated regrind (95% by weight of polyester + 5% by weight of polypropylene) |
| 2.5% by weight of | polypropylene |

COMPARATIVE EXAMPLE 2

Example 1 from EP-A 0 300 060 was repeated. The example was modified with concomitant use of 50% by weight of regrind. It can be seen from Table 2 that marked yellow coloration of the film was observed.

Base layer B was a mixture of:

| | |
|---|---|
| 45.0% by weight of | polyethylene terephthalate homopolymer with an SV of 800 |
| 50.0% by weight of | self-generated regrind (95% by weight of polyester + 5% by weight of polypropylene) |
| 5.0% by weight of | polypropylene |

COMPARATIVE EXAMPLE 3

Example 1 from EP-A 0 360 201 was repeated. The example was modified with concomitant use of 50% by weight of regrind. It can be seen from Table 2 that marked yellow coloration of the film was observed.

Base layer B was a mixture of:

| | |
|---|---|
| 40.0% by weight of | polyethylene terephthalate homopolymer with an SV of 800 |
| 50.0% by weight of | self-generated regrind (95% by weight of polyester + 5% by weight of polypropylene) |
| 10.0% by weight of | polypropylene |

COMPARATIVE EXAMPLE 4

Example 1 from DE-A 195 40 277 was repeated. The example was modified with concomitant use of 50% by weight of regrind. It can be seen from Table 2 that marked yellow coloration of the film was observed.

Base layer B was a mixture of:

| | |
|---|---|
| 43.5% by weight of | polyethylene terephthalate homopolymer with an SV of 800 |
| 50.0% by weight of | self-generated regrind (95% by weight of polyester + 5% by weight of polystyrene) |
| 6.5% by weight of | polystyrene |

TABLE 2

| Example | Film thickness μm | Layer structure | Added to polyester | Additive concentration in base layer % | Glass transition temperature of additive °C. | Whiteness % | Opacity % | Evaluation of film yellowness | Gloss | Coefficient of friction COF Side A against Side C | Average roughness $R_a$ nm Side A | Average roughness $R_a$ nm Side C |
|---|---|---|---|---|---|---|---|---|---|---|---|---|
| E 1 | 23 | B | COC | 10 | 170 | 75 | 75 | ++ | 115 | 0.52 | 120 | 120 |
| E 2 | 23 | B | COC | 10 | 170 | 76 | 80 | + | 120 | 0.50 | 110 | 110 |
| E 3 | 96 | B | COC | 8 | 170 | 85 | 85 | ++ | 125 | 0.42 | 100 | 100 |
| E 4 | 96 | B | COC | 8 | 170 | 86 | 90 | + | 130 | 0.35 | 98 | 98 |
| CE 1 | 155 | B | Polypropylene | 5 | −10 | 80 | 70 | − | 46 | 0.45 | 410 | 410 |
| CE 2 | 100 | B | Polypropylene | 10 | −10 | 88 | 80 | − | 57 | 0.45 | 180 | 180 |

TABLE 2-continued

| Example | Film thickness μm | Layer structure | Added to polyester | Additive concentration in base layer % | Glass transition temperature of additive °C | Whiteness % | Opacity % | Evaluation of film yellowness | Gloss | Coefficient of friction COF Side A against Side C | Average roughness $R_a$ nm Side A | Average roughness $R_a$ nm Side C |
|---|---|---|---|---|---|---|---|---|---|---|---|---|
| CE 3 | 100 | ABA | Polypropylene | 20 | −10 | 92 | 89 | − | 54 | 0.25 | 370 | 370 |
| CE 4 | 125 | B | Polystyrene | 13 | 100 | 82 | 82 | − | 51 | 0.35 | 480 | 480 |

Key to yellowness in films produced:
++: no yellowing detectable
+: slight yellow coloration detectable
−: marked yellow coloration detectable

What is claimed is:

1. A biaxially oriented polyester film, comprising: at least a base layer made from polyester, wherein at least said base layer comprises from about 4 to about 50% by weight cycloolefin copolymer (COC) selected from the class consisting of norbornene-ethylene copolymers and tetracyclododecene-ethylene copolymers, and from about 0.1 to about 25% by weight of at least one white pigment, based on the weight of said layer, wherein said film in an uncoated state exhibits a gloss of more than about 10 when measured at an angle of 60°, where the glass transition temperature of the COC is within the range from about 110 to about 220° C., said polyester film containing from 10 to 70% regrind formed from said film, said film showing no increase in yellowness compared to film containing no regrind, at least said base layer further comprising an optical brightener, said optical brightener present in an amount ranging from 0.002 ppm to 5% by weight.

2. The polyester film as claimed in claim 1, wherein said film exhibits a whiteness of more than about 80%.

3. The polyester film as claimed in claim 1, wherein said film exhibits an opacity of more than about 55%.

4. The polyester film as claimed in claim 1, wherein an outer layer covers said COC-containing layer.

5. The polyester film as claimed in claim 4, wherein an intermediate layer is positioned between said COC-containing layer and said outer layer.

6. A process for producing a polyester film as claimed in claim 1, in which a melt corresponding to a single-layer film or the melts corresponding to the individual layers of the film are extruded or co-extruded through a flat-film dye, drawing the resultant film onto one or more rolls for solidification, biaxially orienting said film, heat setting said biaxially oriented film, and, if desired, providing a surface activation treatment, wherein said biaxially orienting said film occurs at a temperature during the longitudinal stretching between the range from about 80 to about 130° C. and during the transverse stretching in a range from about 90 to 150° C., and the longitudinal stretch ratio being in a range from about 2.5 to 1 to about 6 to 1; and the transverse stretch ratio being in a range from 3.0 to 1 to about 5.0 to 1.

7. A process for producing the polyester film as claimed in claim 1, in which a melt corresponding to a single-layer film or the melts corresponding to individual layers of said film are extruded or co-extruded through a flat-film dye, drawing off said resultant film on to one or more rolls for solidification, biaxially orienting said film, heat setting said biaxially oriented film, and if desired, applying a surface activating treatment to said film wherein said biaxially orienting of said film occurs at stretching temperatures being less than or equal to 125° C.

8. A biaxially oriented polyester film according to claim 1, said polyester film containing from about 50 to 70% regrind.

* * * * *